United States Patent [19]

Addiego et al.

[11] Patent Number: 5,168,085

[45] Date of Patent: Dec. 1, 1992

[54] MULTI-STAGE TWC SYSTEM

[75] Inventors: William P. Addiego, Corning; Srinivas H. Swaroop, Painted Post; Jimmie L. Williams, Painted Post; Raja R. Wusirika, Painted Post, all of N.Y.

[73] Assignee: Corning Incorporated, Corning, N.Y.

[21] Appl. No.: 703,201

[22] Filed: May 20, 1991

[51] Int. Cl.$^5$ .......................... B01J 29/32; B01J 35/00
[52] U.S. Cl. .......................................... 502/66; 502/71; 502/74; 502/527
[58] Field of Search .......................... 502/66, 74, 527; 423/213.5, 239

[56] References Cited

U.S. PATENT DOCUMENTS

| | | | |
|---|---|---|---|
| 1,789,812 | 1/1931 | Frazer | 423/213.5 |
| 3,801,697 | 4/1974 | Kobylinski et al. | 423/239 |
| 4,973,399 | 11/1990 | Green et al. | 502/67 |
| 5,063,029 | 11/1991 | Mizuno et al. | 422/175 |

FOREIGN PATENT DOCUMENTS

| | | | |
|---|---|---|---|
| 3818 | 9/1979 | European Pat. Off. | 423/213.5 |
| 3007845 | 1/1988 | Japan | 502/66 |
| 1-139144 | 5/1989 | Japan | |
| 1-139145 | 5/1989 | Japan | |
| 1-171625 | 7/1989 | Japan | 423/239 |

Primary Examiner—Carl F. Dees
Attorney, Agent, or Firm—L. Rita Quatrini; Richard N. Wardell

[57] ABSTRACT

Multi-stage catalytic systems and methods are provided for converting $NO_x$, CO, and hydrocarbons in a mixture, to innocuous products. The systems include first and second stages, each with substrate and catalyst. The mixture is contacted with the first stage for conversion of the major portion of the $NO_x$ and a portion of the CO and hydrocarbons. The output is contacted with the second stage to for conversion of CO and hydrocarbons. In one system, the first stage catalyst consists essentially of rhodium and a zeolite; the second stage catalyst comprises a noble metal including platinum and/or palladium, and a support. The mixture has a mole ratio of reducing to oxidizing agents of at least 0.8. Low ammonia is generated. In another system, the first stage substrate is made of material capable of being heated to at least 150° C. in no more than about 20 seconds, has heating means for doing same, and is at this temperature at least part of the time of contact with the mixture. The first stage catalyst comprises a support and rhodium with optionally platinum and/or palladium. The second stage catalyst comprises a support, and platinum and/or palladium, and optionally rhodium. Most of the rhodium is in the first stage; most of the platinum and/or palladium is in the second stage. At least 70% by volume of the $NO_x$, CO, and hydrocarbons is converted. The weight ratio of Pt and/or Pd:Rh in each system is at least about 15:1.

22 Claims, No Drawings

MULTI-STAGE TWC SYSTEM

BACKGROUND OF THE INVENTION

This invention relates to multi-stage catalytic systems for converting pollutants as $NO_x$, CO, and hydrocarbons to innocuous products in which most or all of the rhodium is part of the first stage (partitioned upstream) and most or all of the platinum and/or palladium is part of the second stage (partitioned downstream). In one system, use of a zeolite in conjunction with rhodium as the first stage catalyst has advantages such as efficient conversion of the pollutants over a wider redox window with relatively low amounts of ammonia being generated. In another system, the upstream stage comprises a rapidly heatable substrate the purpose of which is to more efficiently catalyze the conversion of pollutants produced during cold-start or initial start-up of the pollutant generating process (such as automotive combustion) to innocuous products. Moreover, with the systems of the present invention, conversion is achieved with relatively low amounts of rhodium in the system.

Mixtures of oxides of nitrogen, commonly called $NO_x$ or more typically $NO_X$ gases, are generated as by-products in combustion processes such as in automotive engines or in fossil fuel power plants. These oxides are hazardous to health and the environment as they produce acid rain.

Up to the present time $NO_x$ emissions in automotive exhaust have been controlled by reducing them to nitrogen by a three way catalyst (TWC) such as Pt and/or Pd +Rh on a support material and this in turn being in contact with a substrate.

Additionally, there is a need to reduce the cost of catalytic converter systems. For instance, in automotive exhaust converter systems, since the precious metal (PM) catalysts constitute a significant part of the system cost, it is obviously meaningful to reduce the PM content in catalytic converters. In particular, there is a strong need to reduce the rhodium metal content as this is the most expensive PM presently used. On the other hand, rhodium is an essential constituent to achieve three-way activity (simultaneous conversion of CO, hydrocarbons, and $NO_x$). The key, therefore, is to develop a low rhodium catalyst system while maintaining three-way activity. This generally means having an acceptably wide redox window for conversion of CO and hydrocarbons to $CO_2$ and $H_2O$, and $NO_x$ to $N_2$ with little or no ammonia formation. This is important because under reducing conditions, that is at redox ratios of $>1$, $NO_x$ can convert to ammonia or pass through unconverted if sufficient rhodium is not present or if relatively large amounts of platinum or palladium are present. Since ammonia is itself a noxious gas, conversion of $NO_x$ to ammonia is undesirable.

Also, automotive exhaust emission standards are expected to become increasingly stringent in the future. It is expected that such standards can be met only by cleaning cold start exhaust emissions, that is, emissions occurring during about the first two minutes of engine start-up. Cold start emissions account for about 40-50% of the total emissions in the Federal Test Procedure for passenger vehicles. At present, this exhaust is only partially converted because the catalyst is not up to the temperatures required for effective performance. A need exists, therefore, for a way to clean up cold start emissions as part of catalytic control systems.

It would be an advancement in the art, therefore, to have a three way catalytic system for emission control in which efficient conversion of pollutants is achieved with a reduced rhodium content in the system. Additionally it would be an advancement to efficiently control cold start emissions using a reduced rhodium content in the system.

U.S. Pat. No. 4,071,600 and a related publication entitled "Platinum and Palladium Addition to Supported Rhodium Catalysts for Automotive Emission Control", by James C. Schlatter and Kathleen C. Taylor, Journal of Catalysis, 49, 42-50, (1977) relate to partitioning of rhodium and platinum or palladium catalysts in an automotive emission control catalyst system to minimize formation of ammonia, the rhodium being supported on a refractory substrate.

Japanese patent applications 296,422 and 296,423 relate to catalyst systems for cleaning exhaust gases. A reduction catalyst is used on the exhaust gas flowing-in side and an oxidation catalyst is used on the exhaust gas flowing-out side. The reduction catalyst is stated as being a transition metal on zeolite. The downstream oxidation catalyst is alumina with metals among which can be Pt, Pd Rh, La, and Ce. The system is applicable to leanburn conditions in which production of ammonia is not a problem.

SUMMARY OF THE INVENTION

In accordance with one aspect of the invention, there is provided a multi-stage catalytic system suitable for catalyzing conversions of $NO_x$, CO, and hydrocarbons to innocuous products, which comprises a first stage and a second stage. A fluid mixture comprising $NO_x$, CO, and hydrocarbons and having a mole ratio of reducing agents to oxidizing agents of at least about 0.8 is contacted with the first stage to undergo first stage reactions, in which the major portion of the $NO_x$ and a portion of the CO and hydrocarbons are converted to innocuous products. The first stage has a first stage substrate catalyzed with a first stage catalyst, the first stage catalyst consisting essentially of rhodium and a zeolite component. The output mixture from first stage is contacted with the second stage to undergo second stage reactions in which CO and hydrocarbons present are converted to innocuous products. The second stage has a second stage substrate catalyzed with a second stage catalyst. The second stage catalyst comprises a support and a noble metal which includes platinum and/or palladium. The weight ratio of the platinum and/or palladium content to the rhodium content in the system is at least about 15:1. The system results in the conversion of the major portion of the $NO_x$, CO, and hydrocarbons to innocuous products, with the generation of relatively low amounts of ammonia.

In accordance with another aspect of the invention, there is provided a method for catalyzing conversions of $NO_x$, CO, and hydrocarbons to innocuous products, which comprises contacting a fluid mixture comprising the $NO_x$, the CO, and the hydrocarbons with catalysts using the above described catalytic system.

In accordance with another aspect of the invention, there is provided a multi-stage catalytic system suitable for catalyzing conversions of $NO_x$, CO, and hydrocarbons to innocuous products, which comprises a first stage and a second stage. A fluid mixture comprising $NO_x$, CO, and hydrocarbons is contacted with the first stage to undergo first stage reactions in which the major portion of the $NO_x$ and a portion of the CO and hydrocarbons are converted to innocuous products. The first stage has a first stage substrate catalyzed with a first stage catalyst. The first stage substrate comprises a structure made of material being capable of being heated to a temperature of at least about 150° C. within a period of time of no greater than about 20 seconds, and means for heating the structure to this temperature within this period of time. The first stage substrate is at this temperature during at least part of the time of contact with the fluid mixture. The first stage catalyst comprises a noble metal component and a support component. The noble metal component includes rhodium and optionally, platinum and/or palladium. The output mixture from the first stage is contacted with the second stage to undergo second stage reactions in which CO, hydrocarbons, and optionally $NO_x$ present are converted to innocuous products. The second stage has a second stage substrate catalyzed with a second stage catalyst. The second stage catalyst comprises a noble metal component and a support component. The noble metal component includes platinum and/or palladium, and optionally rhodium. The major portion of the rhodium content in the system is present in the first stage catalyst, while the major portion of the platinum and/or palladium content in the system is present in the second stage catalyst. The weight ratio of the platinum and/or palladium content to the rhodium content in the system is at least about 15:1. The system results in the conversion of at least about 70% by volume of the $NO_x$, the CO, and the hydrocarbons present to innocuous products.

In accordance with still another aspect of the invention, there is provided a method for catalyzing conversions of $NO_x$, CO, and hydrocarbons to innocuous products, which comprises contacting a fluid mixture comprising the $NO_x$, the CO, and the hydrocarbons with catalysts using the above described catalytic system having the rapidly heatable substrate as part of the first stage.

DETAILED DESCRIPTION OF THE INVENTION

The present invention relates to a multi-stage catalytic system for catalyzing the conversion of $NO_x$, CO, and hydrocarbons to innocuous products.

In one embodiment, most of the rhodium in the system is partitioned upstream and most of the platinum and/or palladium is positioned downstream. The upstream portion is referred to as the first stage which is made of a first stage substrate catalyzed with a first stage catalyst. The first stage catalyst consists essentially of rhodium and a zeolite component. The downstream portion is referred to as the second stage which is made of a second stage substrate catalyzed with a second stage catalyst. The second stage catalyst comprises platinum and/or palladium and a support component.

In another embodiment, a rapidly heatable substrate is used in the first stage substrate for more efficient conversion during start up of the pollutant generating process. The first stage catalyst comprises a noble metal component and a support. The noble metal component includes rhodium optionally in combination with platinum and/or palladium. The second stage catalyst comprises a noble metal component and a support. The noble metal component includes platinum and/or palladium with optionally, rhodium.

By innocuous products is meant those that are generally harmless to health and the environment, such as $CO_2$, $N_2$, $H_2$, and water.

The catalytic system of the present invention is especially suited to controlling emissions from combustion processes such as automotive combustion. The rapidly heatable substrate is especially effective in controlling cold-start emissions such as occurs in automotive combustion.

In general, the variations of the catalytic system of the present invention work as follows. The initial fluid mixture containing the pollutants is first contacted with a first stage catalyst in order to convert $NO_x$ to innocuous products which in the case of $NO_x$ is $N_2$ gas. Some of the CO and hydrocarbons present can be converted to innocuous products as carbon dioxide and water. The output mixture resulting from contact with the first stage is then contacted with a second stage catalyst in order to convert any CO and hydrocarbons and optionally $NO_x$ present to their respective innocuous products.

As explained previously, one variation of the above described system is to use as part of the first stage, a rapidly heatable substrate which is usually referred to as a heater. This substrate is capable of being heated to a temperature of at least about 150° C. within a period of time of no more than about 20 seconds. The substrate is at this temperature for at least part of the time during contact of the fluid mixture with the first stage. It is preferred that the substrate be at this temperature during the entire duration of the contact of the fluid mixture with the first stage. More commonly, in order to ensure that the substrate is at this temperature during the entire period of contact, it is heated to this temperature prior to contact of the fluid mixture with the first stage. When used in this capacity, the substrate is usually referred to as a preheater. Having the substrate preheated to this temperature is advantageous during cold start (start-up) of the pollutant generating process because at this point the major pollutants are CO and hydrocarbons and the catalyst being up to temperature, can catalyze the conversions of these pollutants immediately. As a result, the efficiency of conversion is increased. The rhodium catalyzes the conversion of these pollutants to innocuous products during the initial phase of the first stage contact, and after warm-up, that is, after the catalyst has reached operating temperature. As the $No_x$ concentration in the fluid mixture increases, the rhodium in the first stage catalyzes the conversion of the $NO_x$ to innocuous products. The output mixture from the first stage is contacted with the second stage to convert CO, hydrocarbons, and optionally $NO_x$ present to innocuous products. The advantage of the heater therefore is to cause more efficient conversion of the CO, the hydrocarbons, and any $NO_x$ by more reactivity at start-up.

Moreover the conversions described above are accomplished with relatively low amounts of rhodium in the catalysts as will now be described.

The initial pollutant containing mixture contains typically $NO_x$, carbon monoxide, and hydrocarbons such as paraffins, olefins, and aromatics, and water, nitrogen, and oxygen. Other components such as carbon dioxide, hydrogen, sulfur dioxide can be present also. As explained previously, during start-up of the pollutant generating process, in particular at cold start of automotive combustion processes, there is typically a greater amount of CO and hydrocarbons present than in steady state combustion.

In accordance with one embodiment, the first stage catalyst consists essentially of rhodium in combination with a zeolite component.

In this embodiment, in order for the catalytic system to efficiently convert the fluid mixture to innocuous products, it is desirable that the mole ratio of reducing agents (such as carbon monoxide and hydrocarbon components) to oxidizing agents (such as the $NO_x$ component in the mixture be controlled to at least about 0.8, and preferably about 0.9 to about 1.25. This operating range of redox ratios is commonly referred to as the redox ratio window. In an automotive exhaust system, this ratio is controlled by regulating the amount of air to the fuel which is characterized by the air-to-fuel ratio. Typically an air-to fuel-ratio of about 14.7 corresponds to a redox ratio of about 1 which represents stoichiometric conditions for the overall oxidation and reduction conversion reactions. In leanburn engines, that is, those in which the redox ratio is on the low side, that is, having a redox ratio of less than about 1 due to excess air content in the combustion mixture, the ratio can be adjusted by adding reducing agents to the fluid mixture. In power plant gases, the redox ratio is typically lower than the operating ranges of the present invention, and therefore, to adjust the redox ratio to the proper levels, reducing agents such as uncombusted fuel can be added.

The fluid mixture is contacted with the first stage catalyst to undergo first stage reactions as follows. The principal first stage reaction is the conversion of the major portion of the $NO_x$ to innocuous products which in this case means nitrogen. Conversion of a portion of the CO and hydrocarbons to innocuous products as carbon dioxide, hydrogen and water occurs.

The amount of the first stage catalyst is sufficient to convert the major portion (greater than about 50% by volume) of the $NO_x$ to innocuous products. Most typically the amount of rhodium is about $0.7 g/ft^3$ to about $2.5 g/ft^3$ (about 0.025 g/liter to about 0.09 g/liter) of total substrate. The rhodium catalyzes the conversion of the $NO_x$ gases to nitrogen. The generation of ammonia in the system is at relatively low levels. The ammonia generated is typically no greater than about 200 ppm by volume.

It is preferred that the zeolite component have a pentasil structure. One preferred type of zeolite having a pentasil structure is ZSM-5 zeolite. A zeolite is a type of molecular sieve that is an aluminosilicate. It is preferred that the mole ratio of $SiO_2$ to $Al_2O_3$ be at least about 50:1, preferably at least about 250:1, more preferably about 500:1 to about 7000:1, and still most preferably at about 1000:1 to about 7000:1. When the higher $SiO_2:Al_2O_3$ mole ratios are used, the amount of ammonia is less than about 100 ppm by volume as shown in the Examples that follow. The high $SiO_2:Al_2O_3$ mole ratios help maintain the structural integrity of the zeolite at high temperatures thus inhibiting deleterious catalytic effects and thus helping to maintain Rh activity which is critical for long-term durability of the catalyst (eg $\geq$ 50,000 miles of driving). The higher ratios are preferred therefore because the $NO_x$ conversion efficiency of aged catalysts in the first stage is maintained at acceptably high levels. With $SiO_2:Al_2O_3$ ratios of about 1000:1 to about 7000:1, at least about 90% by volume of the $NO_x$ is converted to innocuous products. It has been found that as the $SiO_2$ to $Al_2O_3$ mole ratio decreases, then with aging, the $NO_x$ conversion efficiency in the first stage drops substantially resulting in unconverted $NO_x$ passing into the second stage. This in turn results in formation of ammonia. However, as the $SiO_2:Al_2O_3$ ratio of the zeolite is increased, the exchange capacity of the zeolite is reduced (that is, less metal can be exchanged into the zeolite). In practical application, therefore, a ZSM-5 type zeolite, for example, with a $SiO_2:Al_2O_3$ mole ratio of no greater than about 7000:1 is preferred. A zeolite with the preferred $SiO_2:Al_2O_3$ mole ratio of the present invention, that is, about 1000:1 to about 7000:1, is expected to be sufficiently stable as well. Zeolites with the desired $SiO_2:Al_2O_3$ mole ratios can be prepared by those skilled in the art.

An additional benefit afforded by the zeolite is that it converts hydrocarbons to innocuous products by cracking.

In the first stage catalyst the rhodium is typically exchanged or impregnated into the zeolite. This is done usually by ion exchange and/or impregnation of the zeolite with an aqueous solution of a suitable rhodium salt. A sufficient amount of zeolite must be provided to hold and support the desired amount of rhodium. Once the rhodium is exchanged or impregnated into the zeolite, the Rh-zeolite is calcined typically at $\geq$ 400° C. for about 4 to 6 hours.

Components such as binders, and/or promoters can be present as part of the first stage catalyst. Binders hold the supports and promoters in place on the substrate. Promoters are substances which enhance the activity, selectivity, or stability of a catalyst.

The substrate physically holds the catalyst in place in a reactor system. Typical substrate materials are ceramics, glasses, glass ceramics, metals, metal oxides, molecular sieves such as, for example, zeolites, and combinations thereof. Some materials that are suited as substrate materials in accordance with the practice of the present invention are cordierite, nitrides, carbides, borides, and intermetallics, mullite, alumina, lithium aluminosilicates, titania, feldspars, quartz, fused or amorphous silica, clays, aluminates, titanates such as aluminum titanate, silicates, zirconia, spinels, and combinations thereof. Some typical substrates, although it is to be understood that the invention is not limited to these, are disclosed in U.S. Pat. Nos. 4,127,691 and 3,885,977. Those patents are herein incorporated by reference as filed. The first stage substrate in this embodiment can be any shape suited to the application such as, for example, beads, pellets, rings, monoliths, minimonoliths, and honeycombs. Honeycomb structures are preferred. The most typical first stage substrates used in the practice of the present invention especially in the clean-up of automotive exhaust are those made of ceramic material preferably having a honeycomb structure. Especially preferred first stage substrates are made of cordierite having a honeycomb structure of the type disclosed in U.S. Pat. No. 3,885,977. Additionally it has been found useful to use substrates comprised of metal powder mixtures such as aluminum, chromium, silicon, copper, iron, magnesium, nickel, steel, titanium, stainless steel, (including 300 and 400 series), and various alloys of those metals such as are present in stainless steels. Additionally, laid up substrates which are essentially metal sheets or bodies which can be configured as a substrate and used for emission control purposes.

The catalyst can be contacted with the substrate by methods known in the art. For example, calcined rhodium-zeolite can be mixed with colloidal alumina as a binder and applied as a washcoat onto the substrate.

The coating is done by methods known in the art such as dipping the substrate into the washcoat, or spraying the washcoat onto the substrate. Alternately, the zeolite can be coated on the substrate and the rhodium subsequently exchanged into the zeolite. Besides being coated on the substrate, the catalyst can be integrally mixed with the substrate. Some of these techniques which can be utilized in the practice of the present invention, although the invention is not limited to such, are described in U.S. Pat. Nos. 4,637,995, 4,657,880, and 4,912,077. Those patents are herein incorporated by reference as filed. The zeolite can be grown in situ on the substrate as described in U.S. Pat. No. 4,800,187 which is herein incorporated by reference as filed. The rhodium can then be exchanged into the in situ grown zeolite.

The mixture resulting from contact of the initial fluid mixture with the first stage catalyst is then contacted with the second stage made up of a second stage substrate catalyzed with a second stage catalyst to undergo second stage reactions as follows. The principal second stage reactions are the conversions of CO and hydrocarbons present to innocuous products as carbon dioxide, hydrogen, and water. There can be some conversion of $NO_x$ in this stage also.

The second stage catalyst is comprised of a noble metal and a support for the noble metal. The noble metals in this stage can vary. However, the noble metal content includes platinum, or palladium, or combinations of these. The support is preferably high surface area oxides, high surface area ceramics, molecular sieves, for example zeolites, and combinations thereof. Other components can be present such as binders and catalytic and structural promoters. The support can be, for example, types of alumina such as gamma alumina, or lanthanum beta alumina, or silica, zirconia, spinel, titanium dioxide, or combinations of all of these types. The preferred type support material is a high surface area oxide. Typically a high surface area support is chosen so that it together with a binder and substrate such as a ceramic honeycomb has a surface area of about $10m^2/g$ to about $100 \, m^2/g$. Preferred supports are alumina or combinations of alumina and ceria. A preferred high surface area alumina is gamma alumina.

The preferred second stage catalysts are (1) platinum-alumina-ceria, (2) palladium-alumina-ceria, and (3) platinum-palladium-alumina-ceria.

In the presence of platinum and/or palladium, oxidation of the CO and hydrocarbons takes place.

The catalyst can be contacted with or in contact with the substrate by methods known in the art, for example by being coated on or integrally mixed with the substrate as described previously.

The first and second stages can be separate units, that is each substrate and catalyst is a separate part. In this case the units are placed in sequence so that the first stage unit is first to come in contact with the initial fluid mixture and the second stage unit is positioned to come in contact with the exit mixture from the first stage unit. Each unit is catalyzed with the respective catalysts. The first and second stages can also be in present on a single substrate unit. In this case, it is desirable to have the first and second stages separated by a section of the unit which is untreated. This allows for effective partitioning of the catalysts and separation of the first and second stage reactions. Alternately, the first and second stages can be present as layers with or without an intermediate layer of inert material without a catalyst placed therebetween. The intermediate layer is typically support material without the noble metal.

The total amount of noble metals in the catalytic system is about 20 $g/ft^3$ to about 40 $g/ft^3$ (about 0.7 g/liter to about 1.4 g/liter) of total substrate. The total amount of Rh in the catalytic system is about 0.7 $g/ft^3$ to about 2.5 $g/ft^3$ (about 0.02 g/liter to about 0.09 g/liter) of total substrate. The weight ratio of (Pt +Pd):Rh in the total system therefore is at least about 15 to 1, and preferably about 15 to 1 to about 30 to 1. Up to now the weight ratio of (Pt+Pd):Rh has been about 5:1 to about 10 to 1. Therefore it can be seen that the system of the present invention allows for significant reduction in the rhodium content. The Pt:Pd weight ratio in the system is typically about 1:1 to about 1.5:1.

The main advantages simultaneously afforded by the above described embodiment of the present invention can be summed up, therefore, as follows. Efficient conversion of the pollutants to innocuous products is achieved using less rhodium than has been previously used. There is better selectivity for the reduction of $NO_x$ to $N_2$ by partitioning and segmenting the Rh upstream from other noble metals. As a result the generation of ammonia in the system is relatively low. With use of the preferred types of zeolites, no significant amounts of ammonia are generated. Also with use of the preferred types of zeolites, there is greater long term durability of the catalytic system.

Use of a Rapidly Heatable Substrate

In accordance with another embodiment, a rapidly heatable substrate is made part of the first stage of the multi-stage catalytic system. The fluid mixture is contacted with the first stage catalyst to undergo first stage reactions as follows. One of the first stage reactions is the conversion of the major portion of the $NO_x$ to innocuous products as end products. Another first stage reaction is the conversion of a portion of the CO and hydrocarbons to innocuous products as end products. Depending on the particular reactions that take place, the products can be $N_2$ $H_2$, $CO_2$, and water. For example, $NO_x$ gases can react with CO or hydrocarbons to produce $CO_2$ and $N_2$ as end products.

In this embodiment, the mole ratio of reducing agents to oxidizing agents is preferably at least about 0.8, and most preferably about 0.9 to about 1.25.

The first stage catalyst is made up of a noble metal comprising rhodium, and a support material.

The noble metal constituent can be essentially any noble metal but includes rhodium alone or in combination with platinum, palladium or combinations of platinum and palladium. The preferred noble metal is rhodium, in order to convert the $NO_x$ without forming significant amounts of ammonia.

One requirement of the support material in this embodiment is that it be a thermally stable material, that is, able to withstand the temperatures of the system and the rapid rise to temperature which takes place in the heater. The preferred support materials are high surface area oxides, high surface area ceramics, molecular sieves, and combinations of these. The various types of and preferred support materials that can be used are essentially the same as described previously.

The preferred first stage catalysts are rhodium-alumina-ceria, and rhodium-zeolite. Alumina can be used with the rhodium-zeolite as a binder in which case it is present in an amount of <10% by weight of the entire washcoat, that is, the noble metal, support, binders, promoters, etc.

In accordance with an especially preferred embodiment, the first stage catalyst is a rhodium-exchanged or impregnated zeolite as described previously.

The amount of the first stage catalyst is sufficient to catalyze the conversion of at least about 70% by volume of the $NO_x$ and at least about 50% by volume of the CO and hydrocarbons to innocuous products. Most typically the rhodium content in the entire system is about 0.7g/ft$^3$ to about 2.5 g/ft$^3$ (about 0.025 g/liter to about 0.09 g/liter) of total substrate. The amount of support component is at least sufficient to hold the desired amounts noble metals on the substrate. The major portion of the rhodium content is in the first stage. It is preferred that all the rhodium be in the first stage for reasons which will be explained later.

The first stage catalyst is in contact with the first stage substrate. The first stage substrate is made of a monolith structure and heating means. In this embodiment, it is critical that the substrate be capable of being heated to a temperature sufficient for the first stage catalyst to catalyze the first stage reactions, in particular the conversions of the CO and hydrocarbons. This temperature is typically at least about 150° C. It is also important that the substrate be capable of being heated to this temperature rapidly, that is within a period of no more than about 20 seconds. This is desirable especially in automotive applications. In general, any type of heat resistant material can be used such as metals, ceramic-metal combinations, electrically conducting ceramics, and combinations thereof. However the preferred materials are alloys of iron with chromium, and aluminum. Some substrate materials that are especially suited to the practice of the present invention, although the invention is not limited to such, are disclosed in U.S. Pat. application Ser. No. 619,934. That application is herein incorporated by reference as filed. It is especially preferred that the first stage substrate have a honeycomb structure. The heating means heats the substrate to at least about 150° C. in no more than about 20 seconds. In general, any heating means can be used. It is preferred that the substrate be connected with electrodes so that it is rapidly brought up to temperature by passing an electric current through it.

The catalyst can be contacted with or in contact with the substrate by methods known in the art. In accordance with one embodiment, a metal substrate is coated with Rh-zeolite catalyst and colloidal alumina binder.

In accordance with another preferred embodiment, prior to the pollutant generating process, the first stage substrate is heated to the previously described temperature for the first stage reactions. This is done typically by passing an electric current through it. At the start of the pollutant generating process, such as in automotive engine start up or cold start, the emissions are primarily CO and hydrocarbons with relatively minor amounts of $NO_x$. Because the substrate has already been heated, the catalytic reactions take place sooner than they would on a non-heated substrate. As a result, during this start-up phase, the rhodium on the heated substrate behaves predominately as an oxidation catalyst for the conversion of CO and hydrocarbons to innocuous end products. A significant amount of the cold start emissions are converted in this system with a preheater than in non-preheated systems and the conversion of CO and hydrocarbons is higher overall. At steady state conditions, that is, after the period of cold start emissions, the rhodium behaves primarily as a reduction catalyst for conversion of the $NO_x$ to innocuous products as nitrogen. The major portion of the rhodium in the catalytic system is in the first stage catalyst. Since rhodium catalyzes the conversion of $NO_x$ gases to nitrogen with virtually no ammonia formation, it is preferred that essentially all of the rhodium be in the first stage catalyst in order that essentially all of the $NO_x$ be reduced to nitrogen before contact with the second stage catalyst which contains the major portion of the Pt and/or Pd content. (In the presence of Pt and/or Pd, $NO_x$ is converted to ammonia which is undesirable.)

The mixture resulting from contact of the initial fluid mixture with the first stage catalyst is then contacted with the second stage catalyst to undergo second stage reactions as follows. One of the second stage reactions is the conversion of CO and hydrocarbons present to innocuous products. Another second stage reaction is the conversion of any $NO_x$ present to innocuous products but this occurs to a limited degree.

The second stage catalyst comprises a noble metal in contact with a support. The noble metal can be any noble metal but includes one of the following variations or combinations: (1) platinum, (2) palladium, (3) platinum and palladium, (4) platinum and rhodium, (5) palladium and rhodium, and (6) platinum, palladium, and rhodium. The preferred noble metals are platinum and/or palladium. The major portion of the platinum and/or palladium in the entire system is present in the second stage. However, to help maintain catalytic durability, it is sometimes necessary to incorporate some rhodium in the second stage, but this is normally not more than about 20% by weight of the total rhodium content in the system.

The support component is essentially the same as described for the first stage.

Other components can be present such as catalytic and structural promoters such as ceria, lanthanum oxide, barium oxide, etc.

The preferred second stage catalysts are (1) a combination of platinum, alumina, and ceria, (2) a combination of palladium, alumina, and ceria, or (3) combination of platinum, palladium, alumina, and ceria.

The amount of the second stage catalyst is sufficient to catalyze the conversion of CO, hydrocarbons and $NO_x$ present at this point to innocuous products. During cold start, there is typically very little CO, hydrocarbons or $NO_x$ present at this stage since these would be converted in the first stage. Therefore this catalyst is most active during steady state.

The second stage catalyst is in contact with the second stage substrate. The second stage substrate is of the types described in the previous embodiment for second stage substrates.

The catalyst can be contacted with or in contact with the substrate by any of the previously described techniques depending on the catalyst composition.

In this embodiment, the stages are separate units and are positioned as described in the previous embodiment for separate units.

The total and relative amounts of noble metals in the catalytic system is the same as described for the previous embodiment. The amount of support is at least sufficient to hold the noble metals on the substrate.

The main advantages simultaneously afforded by the above described embodiment of the present invention can be summed up, therefore, as follows. Efficient conversion of the pollutants to innocuous products is achieved using less rhodium than has been previously used. There is better selectivity for the reduction of $NO_x$ to $N_2$ by partitioning and segmenting the Rh upstream from other noble metals. Use of the preheater allows for conversion of CO, hydrocarbons and small amounts of $NO_x$ during cold start, thus increasing overall efficiency of conversion of these pollutants.

The following non-limiting examples illustrate some aspects of the present invention.

The following test procedure is carried out on various types of catalysts to determine their effectiveness in converting pollutants to innocuous products.

Simulated automotive gas mixtures of relatively uniform composition are introduced into an enclosed reactor system holding catalyzed substrates measuring about 1" (2.54 cm) in diameter and about ½" to 1" (1.25 to 2.54 cm) in length. The mixtures are contacted with the various types of catalysts. Each mixture consists of by volume about 1000 ppm of $NO_x$, about 333 ppm of propylene, about 167 ppm of propane, about 1% of CO, about 0.33% $H_2$, about 0.77% of $O_2$, about 14% $CO_2$, and the balance $N_2$ The space velocity of the enclosed system is about 50,000 volume changes/hr. The $NO_x$, CO, hydrocarbon, and resulting $NH_3$ gases are monitored by individual detectors. The gas conversions are directly measured as percent conversion by volume compared to inlet concentrations. In each test, the temperature of the container is slowly raised to about 600° C. and at this temperature the oxygen concentration of the gas mixture that is being reacted is varied to determine the effect of redox ratio on conversions and $NH_3$ production.

The following examples of catalysts are subjected to the testing procedure to determine their effectiveness in converting pollutants to innocuous products.

EXAMPLE 1

A commercially available automotive catalyst of $Pt/Rh/Al_2O_3/CeO_2$ on a ceramic honeycomb substrate measuring about 1" in diameter and about 1" in length is used as a comparative example. This catalyst has a noble metal loading of about 40 g/ft$^3$ (about 1.41 g/liter) of substrate, with a Pt:Rh weight ratio of about 10:1. To evaluate its durability and conversion performance after aging, this catalyst is aged at about 970° C. for about 4 hours in a simulated exhaust atmosphere consisting of in percent by volume about 10% steam, about 8% $CO_2$, about 1% $O_2$, and the balance $N_2$. A gas mixture of the type previously described is contacted in various redox ratios with this catalyst. The volume percent conversion and ammonia formation (ppm by volume) are given in Table 1. The net $NO_x$ conversion is the difference between the total percent $NO_x$ conversion and the percent $NO_x$ converted to $NH_3$ From Table 1 it can be seen that the net $NO_x$ conversion (about 95%) and ammonia formation (about 54 ppm) at the given redox ratio are as expected for this catalyst system containing about 3.6 g Rh/ft$^3$ (about 0.13 g/liter) of substrate.

EXAMPLE 2

A $Pt/Rh/Al_2O_3/CeO_2$ catalyst on ceramic honeycomb substrate is prepared according to the following procedure.

About 130 g of gamma alumina and about 46 g of cerium oxide are added to a solution made by dissolving about 26 g of cerium acetate in about 200 ml deionized water, followed by adjustment of the pH to about 3.9 with dilute $HNO_3$ (1:1). The resulting slurry is roll milled with about 600 g of $Al_2O_3$ media for about 18 hours. The pH of the slurry is again adjusted to about 3.9 with $HNO_3$. This slurry is termed Slurry A.

Cordierite honeycombs made by Corning, Inc. under the name of Celcor$^R$ honeycombs measuring about 1" (2.54 cm) in diameter and about 3" (7.62 cm) in length and having about 400 cells/in$^2$ (about 62 cells/cm$^2$) are dipped into the above Slurry A for about 1 minute. The excess slurry is then shaken off the honeycombs. The honeycomb channels are cleared by blowing compressed air through them. The samples are dried in an oven at about 100–120° C. for about ½ hour followed by firing in a furnace at about 550° C. for about 6 hours. An average weight loading of about 30–35 g of alumina-ceria per about 100 g of substrate is observed on these honeycombs.

A 1" (2.54 cm) long piece of this washcoated honeycomb substrate is then loaded with platinum using sufficient chloroplatinic acid to get a loading of about 28.5 g Pt/ft$^3$ (about 1 g/liter) of substrate using a predetermined amount of chloroplatinic acid. This noble metal loaded honeycomb is dried in an oven at about 150° C. for about 45 minutes followed by firing in a furnace at about 600° C. for about 45 minutes. The platinum loaded honeycomb is then loaded with rhodium by being dipped into a solution of rhodium nitrate and being fired at about 600° C. for about 45 minutes to get a rhodium loading of about 1.1 g/ft$^3$ (about 0.04 g/liter) of substrate. The Pt:Rh weight ratio in this catalyst is about 26:1, and the total noble metal loading is about 30 g/ft$^3$, (about 1.06 g/liter) of substrate.

This catalyst is aged at about 970° C. as described in Example 1.

A gas mixture as described previously in various redox ratios is contacted with the aged catalyst. The $NO_x$ conversions and ammonia formation are given in Table 1. Comparisons of Examples 1 and 2 show high ammonia for Example 2 at a redox ratio of about 1.25. This is typical of "mixed" Pt/Rh catalysts which are similar to current commercial catalysts, but which have relatively low rhodium (as in catalysts with a Pt:Rh weight ratio of about 26:1, and a rhodium loading of about 1.1 g/ft$^3$ (about 0.04 g/liter) of substrate) At a redox ratio of about 1.25, the catalyst in this example produces about 380 ppm of $NH_3$ compared to about 54 ppm with the reference commercial catalyst in Example 1 as shown in Table 1. Correspondingly, the net $NO_x$ conversion with the aged catalyst of this example is only about 57% which is low.

EXAMPLE 3

A partitioned Rh-zeolite plus $Pt/Al_2O_3/CeO_2$ catalyst is prepared as follows.

A commercially available ZSM-5 zeolite with a $SiO_2$:$Al_2O_3$ mole ratio of about 280:1 is ion-exchanged with rhodium in about a $10^{-3}$ molar solution of $Rh(NO_3)_3$ in water by refluxing about 100 g of the zeolite with about 400 ml of the solution at about 80–90° C. for about 4 hours. The Rh-zeolite which is obtained is filtered, dried, and calcined at about 450° C. for about 6 hours.

About 50g of Rh-zeolite prepared as described above and about 1.58g of boehmite alumina binder are added to about 51.6g of deionized water and roll mixed with about 150g of $Al_2O_3$ media for about 2 hours. The media is removed and the pH of the slurry is adjusted to about 3.5 with dilute $HNO_3$. This slurry is washcoated on a 1" diameter X 0.5" (2.54 cm × 1.25 cm) long cordierite honeycomb as described in Example 2. After the drying and calcining procedures, the washcoat loading is about 48 g per about 100 g of substrate, resulting in a rhodium loading of about 2.2g/ft3 (about .08 g/liter) of this substrate. This is designated Catalyst 3A.

Slurry A is prepared as described above. Cordierite honeycombs measuring about 1" (about 2.54 cm) in diameter and about 3.5" (about 8.89 cm) in length are dipped into this slurry and fired as described above to get an $Al_2O_3$-$CeO_2$ loading of about 35 g/ per about 100 g of this substrate after firing. A 0.5" (1.27 cm) long piece of this washcoated honeycomb is cut and used to load about 57g Pt/ft$^3$ (about 2.0 g/liter) of this substrate, using a predetermined amount of chloroplatinic acid. This is designated Catalyst 3B.

Catalysts 3A and 3B are aged at about 970° C. for about 4 hours as described in Example 1. A gas mixture as described previously in various redox ratios is contacted with the aged honeycombs such that catalyst 3A is placed upstream and contacted first with the gas stream, and catalyst 3B is placed downstream. This combination, referred to as Catalyst 3 has a Pt:Rh weight ratio of about 30 g/ft$^3$ (about 1.06 g/liter) of substrate. The conversions and ammonia formation are given in FIG. 3. The $NO_x$ conversions and ammonia formation are given in Table 1.

Comparison of Examples 1, 2, and 3 shows that Example 3 catalyst results in significantly lower NH3 formation (about 170 ppm) compared to Example 2 catalyst (about 380 ppm), although they both have nearly the same noble metal loadings. The net $NO_x$ conversions are correspondingly higher with the Example 3 catalyst. However, comparison with the higher rhodium containing catalyst of Example 1 shows that the Example 3 catalyst has poorer net $NO_x$ conversion.

EXAMPLE 4

The partitioned catalyst of Example 3 is repeated except that the zeolite used is a ZSM-5 zeolite with $SiO_2$:$Al_2O_3$ mole ratio of about 500. The platinum and rhodium loadings in this catalyst are similar to those in the Example 3 catalyst.

The net $NO_x$ conversions and $NH_3$ formation observed on the aged catalyst of Example 4 are given in Table 1. Compared to Example 3, this catalyst has higher net $NO_x$ conversion (85% vs 75%). Of course, this catalyst also has better $NO_x$ and $NH_3$ formation characteristics compared to the Example 2 catalyst.

EXAMPLE 5

The partitioned catalyst of Example 3 is repeated except that the zeolite used is a ZSM-5 zeolite with a $SiO_2$:$Al_2O_3$ mole ratio of about 1122. The platinum and rhodium loadings in this catalyst are similar to the Example 3 catalyst.

The net $NO_x$ conversions and $NH_3$ formation observed on the aged catalyst of Example 5 are given in Table 1. Compared to Examples 3 and 4 catalysts, this catalyst has higher net $NO_x$ conversion. Of course, this catalyst also has better $NO_x$ conversion and lower $NH_3$ formation compared to the Example 2 catalyst. Most significantly, the Example catalyst has net $NO_x$ conversion (93%) and $NH_3$ formation (50 ppm) very similar to the reference commercial catalyst in Example 1 (95% and 54 ppm, respectively). This is obtained with the catalyst of the present invention at a rhodium loading of about 1.1 g/ft$^3$, (about 0.04 g/liter) of substrate, whereas the Example 1 reference catalyst has a rhodium loading of about 3.6 g/ft$^3$ (about 0.13 g/liter) of substrate.

TABLE 1

$NO_x$ conversion and ammonia formation at redox ratio of 1.25 with various example catalysts. All aged catalysts.

| | | Conversion | | |
| | | Total $NO_x$ % | Net $NO_x$ % | $NH_3$ formation ppm |
|---|---|---|---|---|
| Example | Catalyst description | | | |
| 1 | Pt/Rh/$Al_2O_3$/$CeO_2$ Commercial | 100 | 95 | 54 |
| 2 | Pt/Rh/$Al_2O_3$/$CeO_2$ | 95 | 57 | 380 |
| 3 | Rh/Zeolite Pt/$Al_2O_3$/$CeO_2$ Zeolite $SiO_2$:$Al_2O_3$ mole ratio = 280 First stage Second stage | 92 | 75 | 170 |
| 4 | Same as 3 but with Zeolite $SiO_2$:$Al_2O_3$ mole ratio = 500 | 97 | 85 | 120 |
| 5 | Same as 3 but with Zeolite $SiO_2$:$Al_2O_3$ mole ratio = 1122 | 98 | 93 | 50 |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A multi-stage catalytic system suitable for catalyzing conversions of $NO_x$, CO, and hydrocarbons to innocuous products, said system comprising:
   a) a first stage with which a fluid mixture comprising said $NO_x$, said CO, and said hydrocarbons is contacted for converting the major portion of said $NO_x$ and a portion of said CO and said hydrocarbons to innocuous products, said fluid mixture having a mole ratio of reducing agents to oxidizing agents of at least about 0.8, said first stage having a first stage substrate catalyzed with a first stage catalyst, said first stage catalyst consisting essentially of rhodium-zeolite the zeolite having a $SiO_2$ to $Al_2O_3$ mole ratio of at least about 50 to 1; and
   b) a second stage with which the output mixture from said first stage is contacted for converting CO and hydrocarbons to innocuous products, said second stage having a second stage substrate catalyzed with a second stage catalyst, said second stage catalyst comprising a noble metal and a support, said noble metal including noble metals selected from the group consisting of platinum, palladium, and combinations thereof, the weight ratio of the platinum and/or palladium content to the rhodium content in said system being at least about 15:1, said system resulting in the conversion of the major portion of the $NO_x$, CO, and hydrocarbons present to innocuous products, with the generation of ammonia in said system being at relatively low levels.

2. A catalytic system of claim 1 wherein said zeolite has a pentasil structure.

3. A catalytic system of claim 2 wherein said zeolite is a ZSM-5 zeolite.

4. A catalytic system of claim 1 wherein said mole ratio of $SiO_2$ to $Al_2O_3$ is at least about 250:1.

5. A catalytic system of claim 4 wherein said mole ratio of $SiO_2$ to $Al_2O_3$ is about 500:1 to about 7000:1.

6. A catalytic system of claim 5 wherein said mole ratio of $SiO_2$ to $Al_2O_3$ is about 1000:1 to about 7000:1.

7. A catalytic system of claim 6 wherein at least about 90% by volume of said $NO_x$ is converted to innocuous products.

8. A catalytic system of claim 1 wherein said support component of said second stage catalyst is selected from the group consisting of high surface area ceramics, high surface area oxides, molecular sieves, and combinations thereof.

9. A catalytic system of claim 8 wherein said support component is selected from the group consisting of alumina, and a combination of alumina and ceria.

10. A catalytic system of claim 1 wherein said second stage catalyst is selected from the group consisting of a combination of platinum, alumina, and ceria, a combination of palladium, alumina, and ceria, and a combination of platinum, palladium, alumina, and ceria.

11. A catalytic system of claim 1 wherein said substrates are made of materials selected from the group consisting of ceramics, glass ceramics, glasses, metals, metal oxides, molecular sieves, and combinations thereof.

12. A catalytic system of claim 1 wherein said weight ratio of platinum and/or palladium to rhodium in said system is about 15 to 1 to about 30 to 1.

13. A multi-stage catalytic system suitable for catalyzing conversions of $NO_x$, CO, and hydrocarbons to innocuous products, said system comprising:
   a) a first stage with which a fluid mixture comprising said $NO_x$, said CO, and said hydrocarbons is contacted for converting the major portion of said $NO_x$ and a portion of said CO and said hydrocarbons to innocuous products, said first stage having a first stage substrate catalyzed with a first stage catalyst, said first stage substrate comprising a structure made of material being capable of being heated to a temperature of at least about 150° C. within a period of time of no greater than about 20 seconds, and means for heating said structure to said temperature within said period of time, said first stage substrate being at said temperature during at least a portion of the time of said contact of said fluid mixture with said first stage, said first stage catalyst consisting essentially of rhodium-zeolite said zeolite having a $SiO_2$ to $Al_2O_3$ mole ratio of at least about 50 to 1; and
   b) a second stage with which the output mixture from said first stage is contacted for converting CO, hydrocarbons, and optionally $NO_x$ to innocuous products, said second stage having a second stage substrate catalyzed with a second stage catalyst, said second stage catalyst comprising a noble metal component and a support component, said noble metal component including noble metals selected from the group consisting of platinum, palladium, a combination of platinum and palladium, a combination of platinum and rhodium, a combination of palladium and rhodium, and a combination of platinum, palladium, and rhodium, the major portion of the rhodium content in said catalytic system being present in said first stage catalyst, the major portion of the platinum and/or palladium content in said catalytic system being present in said second stage catalyst, the weight ratio of the platinum and/or palladium content to the rhodium content in said catalytic system resulting in the conversion of at least about 70% by volume of the $NO_x$, the CO, and the hydrocarbons present to innocuous products.

14. A catalytic system of claim 13 wherein said first stage substrate is made of material selected from the group consisting of metals, ceramic-metal combinations, electrically conducting ceramics, and combinations thereof.

15. A catalytic system of claim 14 wherein said first stage substrate comprises Fe-Al-Cr alloys.

16. A catalytic system of claim 15 wherein said noble metal of said second stage catalyst is selected from the group consisting of platinum, palladium, and combinations thereof.

17. A catalytic system of claim 13 wherein said second stage catalyst is selected from the group consisting of a combination of platinum, alumina, and ceria, a combination of palladium, alumina, and ceria, and a combination of platinum, palladium, alumina, and ceria.

18. A catalytic system of claim 13 wherein said second stage substrate is made of materials selected from the group consisting of ceramics, glass ceramics, glasses, metals, molecular sieves, and combinations thereof.

19. A catalytic system of claim 13 wherein said weight ratio of platinum and/or palladium to rhodium in said system is about 15 to 1 to about 30 to 1.

20. A catalytic system of claim 13 wherein said mole ratio of $SiO_2$ to $Al_2O_3$ is at least about 250:1.

21. A catalytic system of claim 20 wherein said mole ratio of $SiO_2$ to $Al_2O_3$ is about 500:1 to about 7000:1.

22. A catalytic system of claim 21 wherein said mole ratio of $SiO_2$ to $Al_2O_3$ is about 1000:1 to about 7000:1.

* * * * *

UNITED STATES PATENT AND TRADEMARK OFFICE
CERTIFICATE OF CORRECTION

PATENT NO. : 5,168,085  
DATED : December 1, 1992  
INVENTOR(S) : William P. Addiego, Srinivas H. Swaroop, Jimmie L. Williams and Raja R. Wusirika It is certified that error appears in the above-indentified patent and that said Letters Patent is hereby corrected as shown below:

Col. 16, line 15 insert "being at least about 15:1, said catalytic system" after "system"

Col. 16, line 27, "15" should be "13"

Signed and Sealed this

Seventeenth Day of January, 1995

Attest:

BRUCE LEHMAN

Attesting Officer

Commissioner of Patents and Trademarks